United States Patent Office 3,833,542
Patented Sept. 3, 1974

3,833,542
MANUFACTURE OF THERMALLY STABILIZED POLYETHYLENE TEREPHTHALATE
Stanley David Lazarus, Petersburg, and Brian Armstead Dementi, Richmond, Va., assignors to Allied Chemical Corporation, New York, N.Y.
No Drawing. Continuation of abandoned application Ser. No. 167,809, July 30, 1971. This application Aug. 17, 1973, Ser. No. 389,298
Int. Cl. C08g 17/04, 51/62
U.S. Cl. 260—45.75 C    1 Claim

ABSTRACT OF THE DISCLOSURE

The preparation of linear high-molecular weight, film and fiber forming polyester wherein a polycarboxylic acid is reacted with a polyol; a stabilizing amount of dichloro (di-2-pyridylamine) copper (II)

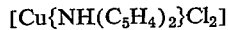

or bis(di-2-pyridylamine) copper (II) chloride

are incorporated therein to improve stability to carboxyl degradation.

---

This is a continuation of Application Ser. No. 167,809, filed July 30, 1971, now abandoned.

BACKGROUND OF THE INVENTION

Field of the Invention

This invention relates to a linear high-molecular weight heat stable film and fiber forming polyester and to a new and novel process for preparing it. More particularly, this invention relates to an improved linear high-molecular weight carboxylically stable polyester film and fiber forming polyester which has a stabilizing amount of dichloro(di-2-pyridylamine) copper (II)

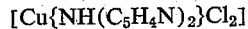

or bis(di-2-pyridylamine) copper (II) chloride

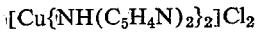

incorporated therein and to a process for preparing said improved heat stable polyester.

Description of the Prior Art

Linear high-molecular weight polyethylene terephthalate film and fiber forming polyesters are well known. They are prepared commercially either by the ester interchange reaction between dimethyl terephthalate and a glycol or by the direct esterification process wherein terephthalic acid is reacted directly with ethylene glycol. These products and processes are well documented in U.S. patents, such as 2,465,310; 3,050,533; 3,051,212; 3,427,287 and 3,484,410 which cover not only the basic products and processes but many improvents thereon. And though many improvements naturally have evolved from such a highly successful commercial product, such success generates more and more uses and such new uses as well as old ones, create demands for a better product in today's commercial arena of positive competition.

Polyethylene terephthalate fibers and cords are known to exhibit excellent dimensional stability, that is, low extension or growth during service, as well as to have a high resistance to thermal degradation; however, under high speed conditions under heavy load, loss of tensile strength is experienced due to high temperature conditions emanating under such conditions. Efforts to remedy this condition have all too often been ineffective.

SUMMARY OF THE INVENTION

The present invention provides a highly improved high-molecular weight heat stable polyester film and fiber forming polyester and to a new and novel process for preparing it. The invention further provides polyester fibers which have excellent resistance to carboxylic degradation when utilized in commercial articles, such as tires, industrial belting, etc. wherein a high degree of heat is built up during use.

Therefore, a prime object of this invention is to provide a new and useful linear high-molecular weight carboxylic stable film and fiber forming polyester and to a new and novel process for preparing it. A further object of this invention is to provide an improved high molecular weight heat stable linear polyester yarn having a small amount of dichloro(di-2-pyridylamine) copper (II) or bis(di-2-pyridylamine) copper (II) chloride incorporated therein to improve carboxylic stability. A still further object of this invention is to provide a carboxylically stable polyester. Other objects will become apparent in the course of the following more detailed description.

In accordance with the above objects, it has now been discovered that an improved heat stable polyethylene terephthalate film and fiber forming polyester is obtained by incorporating therein a stabilizing amount of dichloro-(di-2-pyridylamine) copper (II) or bis(di-2-pyridylamine) copper (II) chloride to improve carboxylic stability. The improved polyester is obtained without undue difficulties in the processing thereof and the additive is compatible with other additives that may be desirable for specific end product uses.

The preparation of the improved polyester can be carried out by reacting an aromatic dicarboxylic acid and/or the lower alkyl ester thereof with a glycol containing 2 to about 10 carbon atoms per molecule under direct esterification and/or ester-interchange conditions having a carboxylically stabilizing amount of dichloro-(di-2-pyridylamine) copper (II) or bis(dis-2-pyridylamine) copper (II) chloride incorporated therein.

The direct esterification of the aromatic dicarboxylic acid and/or the lower alkyl esters thereof and the glycol can start at a temperature as low as 200° C. and range up to 300° C. and at atmospheric and superatmospheric pressures ranging up to 500 p.s.i.g. The reaction, either the direct esterification or ester-interchange is carried out in the absence of oxygen-containing gas. Preferably, the reaction temperature ranges from about 230° C. to about 280° C. and at a pressure ranging from about 50 to 250 p.s.i.g. The reaction times will vary depending upon the reaction temperature and pressure. The amount of glycol is reacted with the aromatic dicarboxylic acid and/or the lower alkyl ester thereof in an amount ranging from about 1 to about 3 moles of glycol per mole of acid. The amount of the carboxylic stabilizer, dichloro-(di-2-pyridylamine) copper (II) or bis(di-2-pyridylamine) copper (II) chloride present ranges generally from about 50 to about 500 parts per million copper, and preferably from about 100 to about 300 parts per million based upon the polyester. The organic copper stabilizer is generally added after the final polycondensation of the polymer.

Other additives can be added to the polymer with complete compatibility therewith to control or tailor the reactions in order to obtain required characteristics of the final polymer for specific end uses. Many such additives are known and utilized to control dyeing, static, luster, flammability, light stability, brightness, etc.

The polycondensation of the material obtained by the direct esterification or ester-interchange reaction between aromatic dicarboxylic acid with a glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon such factors of process polymerization conditions, as pressure and temperature profiles, ingredient mole ratios, surface generation conditions, catalyst type and concentration, any additives utilized, requisite viscosity, etc. Glycol excess and other by-products are removed more easily by utilizing continuous agitation of the mass in some way while simultaneously exposing said mass to a predetermined vacuum.

The carboxylic stabilizer utilized in carrying out the objectives of this invention is dichloro(di-2-pyridylamine) copper (II) or bis(di-2-pyridylamine) copper (II) chloride.

The following examples are illustrative of embodiments of the present invention but are not to be construed as limiting the invention in any way. The ingredient parts are expressed as stated in the examples.

EXAMPLE 1

Six pounds of poly(ethylene terephthalate) chips having an intrinsic viscosity of 0.93 are coated with 3.28 grams of copper (II) dichloro(di-2-pyridylamine) powder by tumbling in a 25 pound capacity polymer can. This is equivalent to 250 p.p.m. copper taken on the weight of polymer. The polymer is then dried for 16 hours at 150° C. in a vacuum oven and spun through a 1-inch extruder into 48 filament yarn which is plied and drawn at a draw ratio of 6.0 to 1 into 1300 denier, 192 filament yarn. This yarn has an intrinsic viscosity of 0.75 and 11 equivalents of carboxyl end groups per $10^6$ grams yarn. It is overfinished with a composition containing an adhesion promoter, twisted into 3 ply, 9 t.p.i. tire cord, dipped in a blocked diisocyanate-epoxide emulsion, stretched at 420° F., dipped in a resorcinol-formaldehyde-vinyl pyridine polymer emulsion, stretched at 440° F. and calendered with rubber to make fabric for tire building. Tires made with this fabric are characterized by excellent durability when run on the wheel test stand.

A sample as defined above containing no carboxylic stabilizer, and used as control was spun, tested, and evaluated against yarn samples containing varying amounts of the dichloro(di-2-pyridylamine) copper (II) and bis(di-2-pyridylamine) copper (II) chloride to test the effect of the copper complex on the carboxylic stability of polyethylene terephthalate is shown in Table I. Parts and/or amount as shown.

TABLE I

| Additive | I.V. | COOH |
|---|---|---|
| 1. None | .78 | 30 eq./$10^6$ gm. |
| 2. Dichloro(di-2-pyridylamine) copper (II): | | |
| (a) 100 p.p.m. copper in the PET sample. | .80 | 17 eq./$10^6$ gm. |
| (b) 150 p.p.m. copper in the PET sample. | .75 | 17 eq./$10^6$ Gm. |
| (c) 250 p.p.m. copper in the PET sample. | .75 | 11 eq./$10^6$ gm. |
| (d) 250 p.p.m. copper in PET | .75 | 11 eq./$10^6$ gm. |
| 3. Bis(di-2-pyridylamine) copper (II) chloride: | .79 | 11 eq./$10^6$ gm. |
| (a) 150 p.p.m. copper in the PET sample. | | |

EXAMPLE 2

Sixty-nine pounds per hour of terephthalic acid and forty-two pounds per hour of ethylene glycol are fed into a continuous esterification train along with 0.05 lb. per hour of antimony triacetate. After esterification, the polymerization is completed in three successive vacuum reactors and the polymer is then pumped to a spinning block. After leaving the last reactor, 0.24 pound per hour of a 50% suspension of copper (II) bis[(di-2-pyridylamine) chloride] in tris (nonyl phenyl) phosphite is metered into the polymer transfer line. The polymer and additive are intimately mixed by passing through a 12-inch stationary mixer. The yarn is spun and drawn in one operation into 1300 denier, 192 filament tire yarns. The yarn has an intrinsic viscosity of 0.90 and 8 equivalents of carboxyl end groups per $10^6$ grams. This yarn is converted into tire cord as in the first example. This cord is characterized as having excellent fatigue and durability properties.

We claim:

1. In the preparation of shaped articles of synthetic linear polyethylene terephthalate condensation polyester, the method of providing a reduction in the free carboxyl content of the polyester to a carboxyl concentration no greater than 17 carboxyl equivalents per $10^6$ grams of polyester which comprises adding to the polyester after the final polycondensation of the polymer a carboxylic stabilizing compound selected from the group consisting of dichloro(di-2-pyridylamine) copper (II) and bis(di-2-pyridylamine) copper (II) chloride, said carboxylic stabilizing compound being added in an amount from about 50 p.p.m. to about 500 p.p.m. copper based on the weight of the polyester, mixing the polyester with the additive, and then melt extruding the shaped article from the polyether.

References Cited

UNITED STATES PATENTS

| 3,446,766 | 5/1969 | Taylor | 260—45.75 |
| 3,696,071 | 10/1972 | Dementi | 260—45.75 |

FOREIGN PATENTS

| 1,020,350 | 2/1966 | Great Britain | 260—75 |

OTHER REFERENCES

Inorganic Syntheses, vol. V, pp. 14, 16, 1957, McGraw-Hill Book Co., New York, N.Y.

VERONICA P. HOKE, Primary Examiner

U.S. Cl. X.R.

260—75 N, 75 T

UNITED STATES PATENT OFFICE
CERTIFICATE OF CORRECTION

Patent No. 3,833,542   Dated September 3, 1974

Inventor(s) Stanley David Lazarus and Brian Armstead Dementi

It is certified that error appears in the above-identified patent and that said Letters Patent are hereby corrected as shown below:

Column 1, line 18, the formula $$[Cu\{NH(C_5H_4)_2\}Cl_2]$$

should read:

$$[Cu\{NH(C_5H_4N)_2\}Cl_2]$$

Column 4, line 47, "polyether" should read --polyester--.

Signed and sealed this 19th day of November 1974.

(SEAL)
Attest:

McCOY M. GIBSON JR.
Attesting Officer

C. MARSHALL DANN
Commissioner of Patents